United States Patent [19]

Rafi-Zadeh

[11] Patent Number: 4,613,181
[45] Date of Patent: Sep. 23, 1986

[54] COVER ASSEMBLY FOR PICKUP TRUCK BED

[76] Inventor: Hassan Rafi-Zadeh, 5301 E. Mockingbird La., Paradise Valley, Ariz. 85253

[21] Appl. No.: 801,288

[22] Filed: Nov. 25, 1985

[51] Int. Cl.⁴ .............................................. B60J 7/08
[52] U.S. Cl. ..................................... 296/100; 296/26; 296/176; 248/166
[58] Field of Search .................. 296/100, 26, 27, 176, 296/172, 173; 248/166, 558

[56] References Cited

U.S. PATENT DOCUMENTS

| | | | |
|---|---|---|---|
| 3,155,423 | 11/1964 | Cripe | 296/100 |
| 3,649,073 | 3/1972 | Whittemore | 296/100 |
| 3,675,885 | 7/1972 | Shute | 296/176 |
| 3,765,716 | 10/1973 | Von Gompel | 296/100 |

Primary Examiner—Robert R. Song
Attorney, Agent, or Firm—Herbert E. Haynes, Jr.

[57] ABSTRACT

A cover assembly for the bed of a pickup truck including a rigid cover which is mounted to the bed by four spring-loaded arms which allow the cover to be moved vertically relative to the bed. The spring-loaded folding arms have arcuate bearing heads which minimize spring distortion when the arms are in their folded positions and have an improved locking arrangement for selectively securing the arms in their extended positions. The folding arms also have reversible mounting brackets which provide stabilized mounting thereof on the bed of pickup trucks having variously sized upper ledges.

7 Claims, 7 Drawing Figures

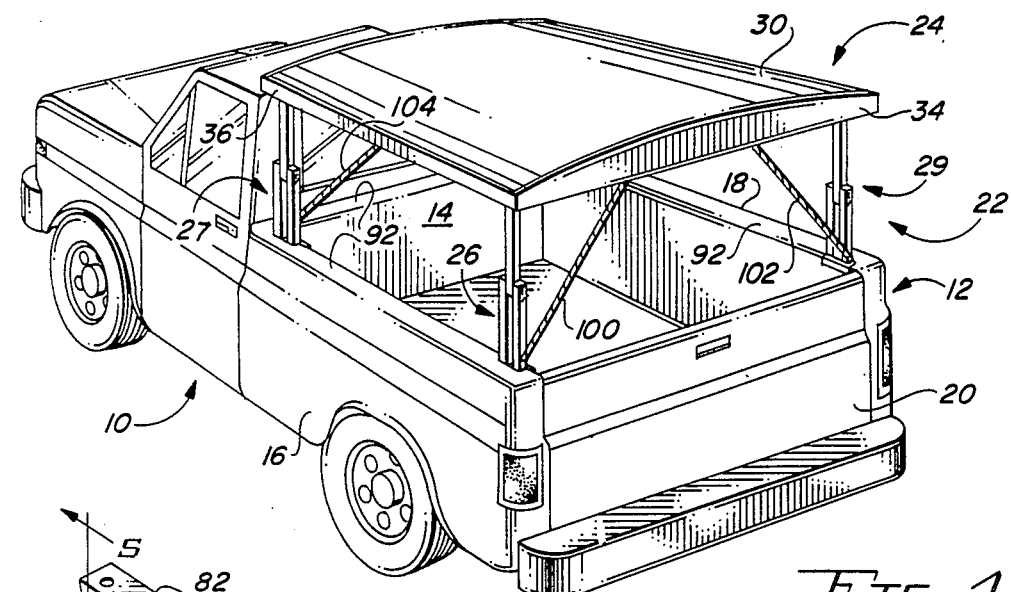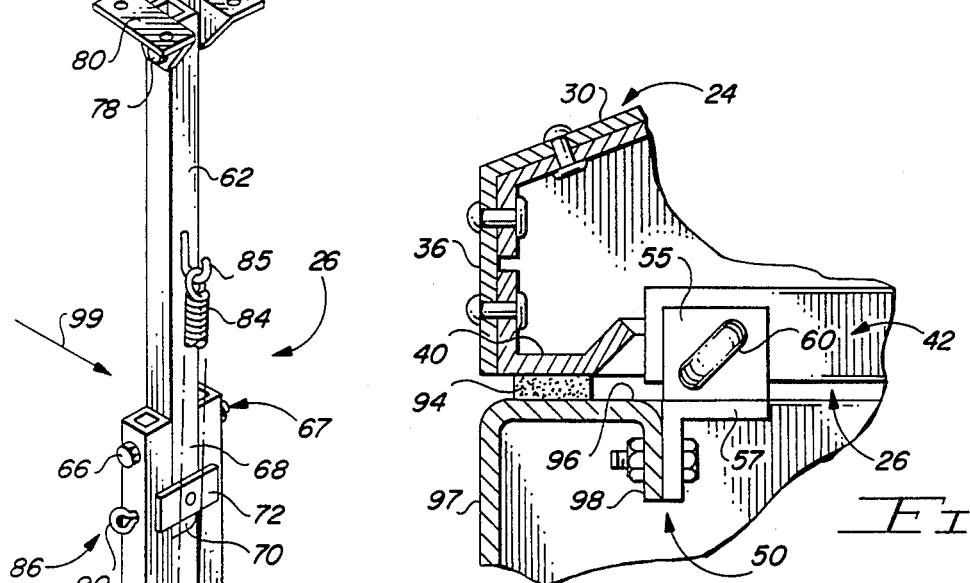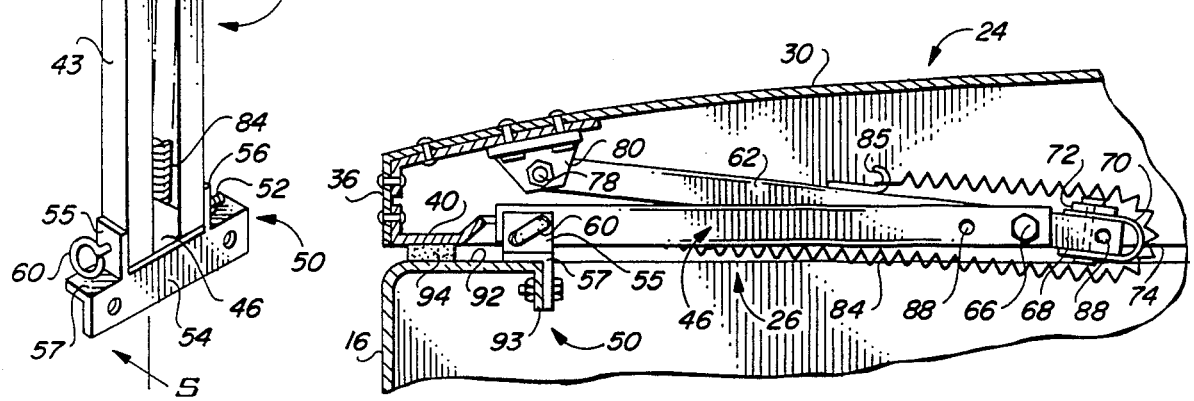

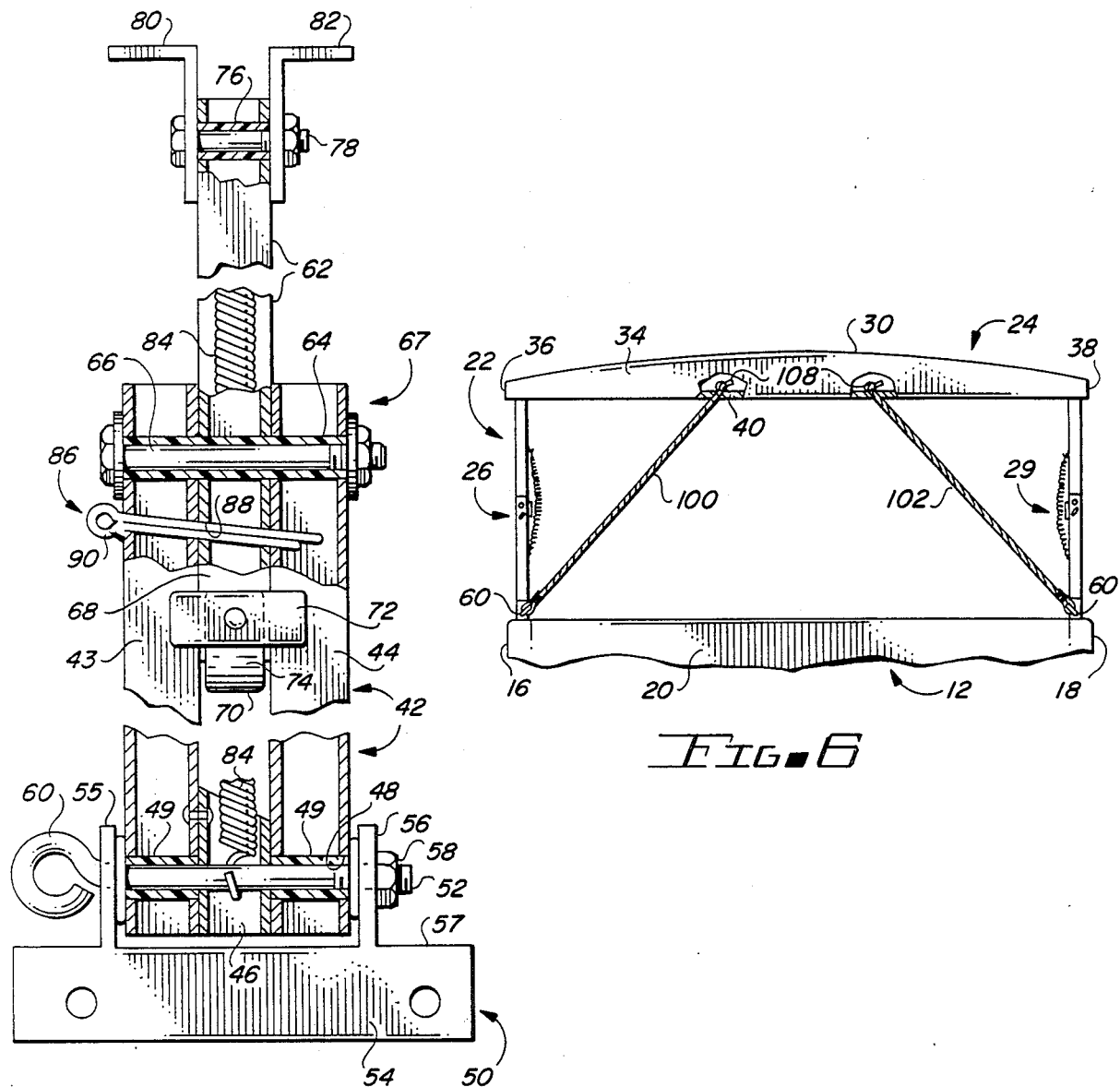
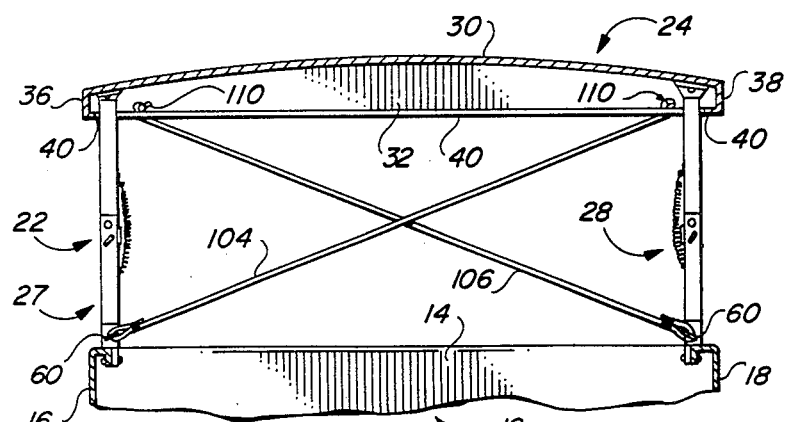

COVER ASSEMBLY FOR PICKUP TRUCK BED

BACKGROUND OF THE INVENTION

1. Field of the Invention

This invention relates in general to covers for the bed of a pickup truck and more particularly to a vertically extensible cover assembly having a lowered position for secured containment of articles in the bed of a pickup truck and an elevated position which permits carrying relatively large articles therein.

2. Description of the Prior Art

The prior art is replete with covers for pickup truck beds ranging from canvas-like covers held in place by snaps to considerably more expensive and complex covers such as a rigid molded plastic cover which is hinged at the front end of the bed. The various types of covers all have some drawbacks. For example, the canvas-like covers mentioned above, sometimes referred to as a tonneau covers, provide virtually no security for articles contained in the bed other than hiding them from view. Also, the only way that relatively large articles, e.g. those which stick up above the sides of the bed, can be carried in a pickup bed that is equipped with a tonneau cover is to remove the cover. The hinged plastic cover provides the desired security but does not make any provisions for carrying large objects.

A particular prior art cover assembly is fully disclosed in U.S. Pat. No. 3,675,885. The cover is a rigid structure which is attached by four special spring-loaded arms located at the corners of the bed of a pickup truck. The arms are designed to fold inwardly relative to the bed of the pickup truck and when all four arms are folded inwardly, the cover will be in its lowered position wherein it will be in resting engagement with the upper ledges of the bed and the cover is provided with means for being locked in its lowered position. By lifting one side or the other of the cover so as to unfold the two arms on the lifted side, the cover will be moved into a tilted partially elevated position so that access to the contents of the pickup bed can be obtained from either side thereof. When both sides of the cover are lifted so as to unfold all four arms, the cover will, of course, be in the fully elevated position and this provides sufficient clearance for virtually any large objects. When the cover is fully elevated, the arms may be locked in their unfolded extended states to allow the pickup to be driven with the cover elevated.

This particular prior art structure is, however, not without some drawbacks. As mentioned above, the folding arms are spring-loaded, and those springs provide the counter-balancing forces needed to help in raising the cover. When the arms are in their folded positions, the counter-balancing springs are stretched taut and folded over the ends of the arms at pivotably interconnected junction, or joint, or legs of the arms. The pivotably interconnected legs are configured so that they provide a relatively sharp edge at the pivot joint and the springs become stretched or otherwise distorted at the location where they engage the pivot joint. Therefore, the counter-balancing springs lose some of their load counter-balancing capability.

The means for locking the folding arms in their extended unfolded positions is in the form of pull pins which are slidably inserted into aligned holes formed through the overlapped ends of the pivotably interconnected legs of each of the folding arms. Sometimes vehicular vibrations cause the pull pins to back out of the aligned holes and this problem is aggravated when the trucks are operated on bumpy roads.

Attachment of the lower ends of the folding arm to the upper ledges of the pickup bed is accomplished by a pair of right angle brackets which are bolted on the upper ledges of the bed. These brackets are difficult to mount on the pickup bed so as to be in proper alignment and they can become mis-aligned in use. Also, the brackets are not readily adaptable for being mounted in various attitudes to accommodate the various configurations of pickup beds being manufactured today.

This prior art structure was disclosed in the above mentioned U.S. Patent as having a stabilizing bar associated with each of the folding arms for stabilizing the cover in a direction coincident with the longitudinal dimension of the vehicle when being driven with the cover in the elevated position. The disclosed longitudinal stabilizing bars are rigid and extend from the pivot joint of their respective arms and are attached to the upper ledges of the pickup bed. The attachment of the stabilizing arms to the ledges of the bed is in the form of a pivot connection so that the stabilizing bars will pivot inwardly with the folding arms when the arms are folded to lower the cover. In use, it was found that the stabilizing bars were not needed in that longitudinal stabilization was not the problem. In that the folding arms must be capable of folding inwardly relative to the pickup truck bed, the cover is inherently unstable in the transverse direction relative to the longitudinal dimension of the pickup truck and not in the longitudinal direction.

Therefore, a need exists for a new and improved cover assembly for use on the bed of a pickup truck with the cover assembly overcoming some of the shortcomings of the prior art.

SUMMARY OF THE INVENTION

In accordance with the present invention, a new and improved cover assembly for the bed of a pickup truck is disclosed with the cover assembly being of the same basic type as the hereinbefore described prior art structure of the referenced U.S. Pat. No. 3,675,885.

Therefore, the cover assembly of the present invention includes a rigid cover which is attachable by four special spring-loaded arms to the upper corners of the pickup truck bed. The present cover assembly differs from the above described prior art structure by providing improved folding arms and a new cover stabilization means.

The improved spring-loaded folding arms include an arcuate bearing head which is located at the folding pivot joint of each of the arms so that when the arms are folded, the counter-balancing springs thereof will be in folded over bearing engagement with a curved surface rather than the relatively sharp end edges of the prior art arms. Therefore, the arcuate bearing heads eliminate, or at least substantially reduce, the spring distortion problem of the prior art.

In addition, improved spring-loaded folding arms of the cover assembly of this invention are provided with an improved locking means for locking the arms in their unfolded, or extended, states. The improved locking means overcomes the prior art problem of the locking means becoming disengaged due to vibrations such as when the truck is being operated on bumpy roads. Further, the folding arms are provided with improved one piece angle brackets which facilitates mounting of the arms on the pickup beds, cannot become mis-aligned and can be mounted in various attitudes to suit various configurations of pickup beds.

Cover stabilization in the direction transverse to the longitudinal dimension of the truck is provided by a first pair of stringers located at the front end of the cover assembly and a second pair of stringers provided at the back end thereof. The stringers extend diagonally between the lower ends of the folding arms and the cover to provide transverse stabilization of the cover when the truck is being operated with the cover in the elevated position. The stringers are preferably flexible cords such as nylon or polyproplene, braided ropes which are taut which the cover is elevated and will collapse into the pickup bed when the cover is in the lowered position.

Accordingly, it is an object of the present invention to provide a new and improved cover assembly for use on the bed of a pickup truck.

Another object of the present invention is to provide a new and improved cover assembly including a vertically extensible rigid cover which is attachable to the bed of a pickup truck by means of four spring-loaded folding arms with the arms being improved in comparison to the prior art.

Another object of the present invention is to provide a new and improved cover assembly of the above described character wherein each of the spring-loaded folding arms is provided with an arcuate bearing head at the pivot joint to eliminate, or at least reduce, spring distortion when the arms are in the folded positions.

Another object of the present invention is to provide a new and improved cover assembly of the above described character wherein each of the spring-loaded folding arms is provided with an improved means for locking the arm in its extended unfolded position.

Another object of the present invention is to provide a new and improved cover assembly of the above described type wherein the spring-loaded folding arms are each provided with an improved mounting bracket for attachment to the bed of the pickup truck.

Still another object of the present invention is to provide a new and improved cover assembly of the above described character which includes a stringer means for elevated stabilization the cover in a direction transverse to the longitudinal dimension of the pickup truck.

The foregoing and other objects of the present invention as well as the invention itself, may be more fully understood from the following description when read in conjunction with the accompanying drawings.

BRIEF DESCRIPTION OF THE DRAWINGS

FIG. 1 is a fragmentary perspective view of the bed of a pickup truck having the vertically extensible cover assembly of the present invention installed thereon.

FIG. 2 is a perspective view of a typical one of the spring-loaded folding arms by which the rigid cover is mounted on the bed of the truck and which provide the vertically extensible capability of the cover assembly.

FIG. 3 is a fragmentary transverse sectional view showing a typical one of the folding arms in the folded position wherein the rigid cover is in the lowered position and also showing one way that the folding arms may be attached to the pickup bed.

FIG. 4 is a view similar to FIG. 3 but showing a different way of attaching the folding arms to a pickup bed of different configuration.

FIG. 5 is an enlarged fragmentary sectional view taken along the line 5—5 of FIG. 2.

FIG. 6 is a fragmentary rear elevational view of the cover assembly illustrating the one set of stringer means which are employed for transverse cover stabilization.

FIG. 7 is a fragmentary transverse sectional view which shows another set of stringer means used for transverse cover stabilization.

DESCRIPTION OF THE PREFERRED EMBODIMENT

Referring more particularly to the drawings, FIG. 1 shows a fragmentary portion of a typical pickup truck 10 including the usual bed 12. The pickup bed is provided with the customary front end panel 14, opposed side panels 16 and 18 and the usual tail gate 20. FIG. 1 also best shows the cover assembly of the present invention as being mounted on the pickup bed 12 with the cover assembly being indicated in its entirety by the reference number 22. As will hereinafter be described in detail, the cover assembly 22 includes the major components of a rigid cover structure 24 and four spring-loaded folding arms 26, 27, 28 and 29 which mount the cover 24 on the pickup bed 12.

The rigid cover structure 24 is configured to match the shape and size of pickup and is therefore of rectangular configuration. The cover 24 has a top panel 30 with a depending front panel 32, depending back panel 34, and an opposed pair of side panels 36 and 38. For reasons which will become apparent as this description progresses, each of the panels 32, 34, 36 and 38 has a lip 40 formed on its lower end so as to extend inwardly from the periphery of the cover 24, and the lips may be formed in any suitable manner such as by riveting or otherwise attaching a right angle member in the manner shown in FIGS. 3 and 4.

Each of the above mentioned spring-loaded arms 26, 27, 28 and 29 are identical. Therefore, the following description of a particular one of the arms 26 will be understood to also apply to each of the other arms 27, 28, and 29.

The folding arm 26, as seen best in FIGS. 2 and 5, includes a bifurcated base leg 42 having coextending spaced apart tines 43 and 44 which are interconnected at their aligned lower ends by a tubular spacer 46. The aligned lower ends of the tines 43 and 44 and the spacer 46 are provided with a transverse aperture 48 having suitable bushings 49 therein. A special one piece mounting bracket 50, for attachment to the bed 12 of the pickup truck, is pivotably connected to the lower end of the base leg 42 by means of a pivot pin 52. The mounting bracket 50 has a right angle channel 54 having a spaced apart pair of lugs 55 and 56 extending normally from one of the flanges 57 of channel member 54, and the lugs have apertures formed therethrough. The lower end of the base leg 42 is located between the lugs 55 and 56 and the pivot pin 52 passes through the aligned apertures of the lugs and the transverse aperture 48 of the base leg 50 as to provide a pivot joint at that location. The pivot pin 52 has a threaded end and a suitable nut 58 is threadingly attached thereto to hold the pivot pin in place. Also, the pivot pin 52 has a ring-shaped head 60 at its opposite end for reasons which will hereinafter be described.

The aligned opposite, e.g. upper, ends of the tines 43 and 44 have an extending leg 62 mounted therebetween. A suitable aperture is formed transversely through the upper ends of the tines 43 and 44 and through the extending leg 62 and a suitable bushing 64 is provided therein. A pivot pin 66, in the form of the illustrated bolt, is located in the bore of the bushing 64 and is held in place by a suitable nut. In this manner, the folding arm 26 is provided with a pivot joint 67 means between the base leg 42 and the extending leg 62.

As shown, the extending leg 62 is configured to have a lower end portion 68 which extends from the pivot joint 67 downwardly between the tines 43 and 44 of the base leg 42. An arcuate bearing head 70 is mounted on the lowermost end of the lower end portion 68 of the extending leg 62, and a transverse stop plate 72 is mounted is spaced relationship with that lowermost end. The transverse stop plate 72 is configured so as to extend laterally and oppositely beyond the opposite sides of the extending leg 62 so as to be moved into bearing engagement with the tines 43 and 44 when the folding arm 26 is moved, as will hereinafter be described, from its folding position to its extended position and thereby prevent movement beyond its extended position. For reasons which will hereinafter be described, the arcuate bearing head 70 extends axially from the end of the extending arm 62 to provide a semi-circular curved surface 74 on the end of the extending arm.

A suitable bushing 76 is disposed in a transverse aperture formed in the opposite, e.g. upper, end of the extending arm 62 and a suitable nut and bolt assembly 78 is mounted in the bushing to hold a pair of right angle mounting flanges 80 and 82 on the opposite sides of the extending arm 62. The mounting flanges 80 and 82 are thereby pivotably carried on the upper end of the extending arm 62 and are employed for connecting the folding arm 26 to cover structure 24.

It is preferred that each of the bushings 49, 64 and 76 used in the folding arm 26 be formed of a self-lubricating material, such as nylon, to facilitate operation thereof.

A spring 84 is provided to urge the arm 26 to its extending position. The lower end of the spring is suitably attached in the area of the tubular space 46 such as by being in hooked engagement with the shank of the pivot pin 52. The upper end of the spring 84 is attached to the extending leg 62 intermediate the ends thereof by means of a suitable hook 85 provided for that purpose. Therefore, the spring 84 extends between the base leg 42 and the extending leg 62 and has an intermediate portion in bearing engagement with the transverse stop plate 72 when the folding arm 26 is in its extended position.

A special locking means 86 is provided for selectively locking the folding arm 26 in its extended position. As shown in FIG. 5, a blind aperture 88 is formed through the tine 43, through the lower end 68 of the extending leg 62 and half way through the tine 44. When the folding arm 26 is extended, the various holes of the blind aperture 88 are in alignment and the aperture slopes downwardly, e.g. is at an acute angle with respect to the flange 57 of the one piece mounting flange 50. A cotter pin 90 is demountably positionable in the blind aperture 88 for locking the folding arm 26 in the extending position. The cotter pin 90 is employed, rather than a conventional pin, due to the inherent tapered configuration of all cotter pins which serves as a wedge in the aperture 88 to resist unintentional dislodgement of the cotter pin. The downwardly sloping attitude of the aperture 88 also helps prevent unintentional pin dislodgement and the aperture 88 is blind so that the pin can't be knocked out of the aperture and to prevent the relatively sharp ends of the cotter key from snagging, scratching, or otherwise catching on any object which might be moved into the vicinity of the arm.

As seen best in FIG. 3, the one piece mounting bracket 50 of the folding arm 26 is mounted on the innermost edge of the upper ledge 92 of the side panel 16 of the pickup bed 12 such as by being bolted to the downturned lip 93 of the ledge. By mounting the bracket 50 as shown, the flange 57 thereof overlays the ledge, and the lugs 55 and 56 of the bracket extend upwardly therefrom. In full size domestically manufactured trucks, the transverse dimension of the ledge 92 is such that when the mounting flange 50 is oriented in the above described manner, the inturned lip 40 of the depending side panel 36 of the cover 24, and the weather strip 94 mounted thereon, will be in resting overlaying engagement on ledge 92 when the cover is in down position. In such full size pickup trucks, the ledge is about $3\frac{1}{2}$ inches wide and this provides sufficient clearance for both the inturned lip 40 and the mounting bracket 50. However, in many of the pickup trucks which are sometimes referred to as mini-pickups, such as the imported pickup trucks, the ledge of the bed of these trucks is sometimes as small as one inch wide.

When mounting the cover assembly 22 on such mini-pickup trucks, the mounting flange 50 of the folding arms 26 is reversed and attached in the manner shown in FIG. 4. This is accomplished by pulling the pivot pin 52 out of the arm and reversing the flange 50 by turning it end for end and reinstalling the pivot pin. The folding arm 26 may then be attached to the innermost edge of the upper ledge 96 of the side panel 97 of the mini-pickup truck such as by being bolted to the downturned lip 98 thereof. By mounting the reversed bracket 50 as shown the flange 57 of the bracket extends inwardly from the ledge 96 rather than being disposed in an overlaying relationship as is the case in full size pickups. Therefore, reversal of the mounting lange 50 as described leaves the entire ledge 96 unencumbered and the lip 40 of the cover 24 can rest thereon as shown.

The right angle mounting flanges 80 and 82 of the folding arm 26 to the underside of the top panel 30 of the rigid cover 24 such as by riveting as shown in FIG. 3.

When the cover assembly 22 is mounted on the bed 12 of the pickup truck 10 by mounting each of the four folding arms 26, 27, 28 and 29 thereon as described above, and those arms are in their normally extending positions, the cover assembly will be in the fully extended position as shown in FIG. 1. Lowering of the cover assembly 22 into its downwardly, or closed, position, as indicated in FIG. 3 is accomplished by simply pushing inwardly on each of the folding arms in the direction of arrow 99 (FIG. 3) in the general vicinity of the pivot joints 67 provided between the base legs 42 and the extending legs 62 thereof. Once this force is applied to the folding arms 26, 27, 28 and 29, the weight of the rigid cover 24 will tend to move the cover down against the bias applied to the arms by the springs 84 thereof. The springs 84 are selected so that the biasing force exerted thereby will just about counter-balance the weight of the cover so that completing of the closing operation is accomplished by pushing downwardly on the cover. The cover assembly 22 may be provided with a suitable locking mechanism (not shown) on each side of the cover and the pickup bed 12 to provide security for article carried in the pickup bed.

To raise the cover assembly, an operator need only lift one side and then the other which is a simple operation due to the counter-balancing forces applied by the spring 84 on the arms 26, 27, 28 and 29 which urges the arms to their extended positions. If access to the pickup bed 12 is desired, rather than complete elevating of the cover assembly 22, the operator need only lift one side, or the other. This results in the arms on the lifted side of the cover being moved to their extended positions with the arms on the non-lifted side remaining folded.

Referring again to FIG. 3 wherein the folding arm 26 is best seen in its folded position. In the folded position, the spring 84 is stretched taut and folded over the pivot joint 67 provided between the base leg 42 and the extending leg 62. The hereinbefore mentioned arcuate bearing head 70 is provided at the point of folded over engagement of the spring 84 with the pivot joint 67 to minimize the spring distorting forces applied to the spring at that point of engagement. To accomplish this, the arcuate bearing head 70 is configured to extend axially beyond the lowermost end of the extending arm 62 so that the spring engages the semi-circular surface 74 of the bearing head rather than the relatively blunt end of the extending leg 62 or the longitudinal edge of the stop plate 72.

Whenever relatively large articles are to be transported with such articles being of a size which extends above the ledge 96 of the bed 12, the cover assembly 22 can be raised to its elevated position to provide the necessary clearance. When the truck 10 is being driven with the cover 22 elevated, vehicle vibrations, cross winds, bumpy roads and the like can cause the cover assembly to shift and collapse laterally of the truck 10. In otherwords, with the arms 26, 27, 28 and 29 locked in their extended position, the entire cover assembly 22 can be shifted laterally, rather than folding down. To prevent this, the cover assembly 22 further comprises means for stabilizing the cover in a direction transverse to the longitudinal dimension of the truck 12 and that means includes a first pair of stringers 100 and 102 at the rear end of the cover assembly and a second pair of stringers 104 and 106 at the front end thereof.

As seen best in FIG. 6, the first pair of stringers 100 and 102 have their lower ends attached to the ring-shaped heads 60 of the pivot pins 52 of the folding arms 26 and 29 respectively. The stringers 100 and 102 extend angularly and upwardly from the connection points of their lower ends and pass through suitable apertures formed through the lip 40 of the depending back panel 34 of the rigid cover 24. The upper ends of the stringers 100 and 102 are knotted as at 103, or otherwise secured in place. The upper ends of the stringers 100 and 102 are located at spaced apart locations intermediate the ends of the back panel 34 to minimize restrictions of the access to the bed 12 from the rear of the truck 10.

The second pair of stringers 104 and 106, as seen in FIG. 7, have their lower ends attached to the ring shaped heads 60 of the pivot pins 52 of the folding arms 27 and 28 respectively. The stringers 104 and 106 extend diagonally in a crossing attitude from the connection points of their lower ends and are attached to the opposite ends of the front depending panel 32 of the rigid cover. As was the case with the rear stringers, the upper ends of the front stringers 104 and 106 pass through suitable apertures provided in the lip 40 of the front panel 32 and are knotted as at 110, or otherwise secured therein.

The stringers 100, 102, 104 and 106 may be formed of any suitable material which is flexible so that when the cover assembly 22 is closed, the stringers will collapse into the bed 12 of the truck 10. A material suitable for this is a cord formed by braiding strands of polyproplene, nylon or the like.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A vertically extensible cover assembly for use on the bed of a pickup truck comprising in combination:
   (a) a rigid cover of rectangular configuration;
   (b) four folding arms each dependingly mounted at a different one of the corners of said cover;
   (c) four separate one piece mounting brackets each pivotably mounted on the lower end of different ones of said folding arms for attachment to the upper ledges of the pickup truck bed at different corners thereof, said mounting brackets being selectively mounted on their respective ones of said folding arms in a first position wherein they are disposed for being mounted in an overlaying position on the ledges of the pickup truck bed when the ledges are relatively wide, and in a reversed second position wherein they are disposed for being mounted in an inwardly extending position on the ledges of pickup truck beds when the ledges are relatively narrow;
   (d) each of said folding arms having a folded position wherein said cover is in a lowered position on the pickup bed when said mounting brackets are mounted thereon and having an unfolded extending position wherein said cover is elevated relative to the pickup truck bed when said mounting brackets are mounted thereon; and
   (e) transverse stabilizing means connected between the lower ends of said folding arms and the front and rear depending panels of said cover for stabilizing the cover in its elevated position against lateral displacement relative to the longitudinal dimension of the pickup truck when said mounting brackets are mounted on the bed thereof.

2. A vertically extensible cover as claimed in claim 1 wherein each of said four mounting brackets comprises:
   (a) a right angle channel member having a first flange for mounting on the downturned lip at the inner edge of the ledge of the pickup truck bed and having a second flange; and
   (b) a pair of lugs extending normally from the second flange of said right angle channel, said pair of lugs being spaced apart and having the lower end of one of said folding arms pivotably mounted therebetween.

3. A vertically extensible cover as claimed in claim 1 wherein said transverse stabilizing means comprises:
   (a) a first pair of flexible stringers at the rear end of said cover and connected so as to extend angularly upwardly from the lower end of the rearwardly disposed pair of said folding arms and the depending rear panel of said cover; and (b) a second pair of flexible stringers at the front end of said cover and connected so as to extend diagonally in crossed fashion from the lower ends of the forwardly disposed pair of said folding arms to the opposite ends of the depending front panel of said cover.

4. A vertically extensible cover as claimed in claim 1 wherein each of said folding arms comprises:

(a) a bifurcated base leg to the lower end of which one of said mounting bracket is pivotably connected;

(b) an extending leg pivotably mounted between the outermost ends of said bifurcated base leg to form a pivot joint therebetween, said extending leg having a lower end portion extending downwardly from the pivot joint between the ends of said bifurcated base leg;

(c) a tension spring connected at one end thereof to the lower end of said bifurcated base leg and having the other end thereof attached intermediate the ends of extending leg, said tension spring having an intermediate portion adjacent the pivot joint of said base leg and said extending leg;

(d) an arcuate bearing head extending axially from the lowermost end of the lower end portion of said extending leg, said arcuate bearing head having a semi-circular surface around which the intermediate portion of said tension spring is folded to prevent distortion thereof when said folding arm is in the folded position thereof.

5. A vertically extensible cover as claimed in claim 4 wherein said folding arm further comprises a locking means for selectively locking said folding arm in its extended position, said locking means comprising:

(a) said outermost ends of said bifurcated base leg and the lower end portion of said extending leg cooperatively defining an aperture; and (b) a cotter pin wedgingly insertable into the aperture defined by the outermost ends of said base leg and the lower end portion of said extending leg when said folding arm is in its extended position.

6. A vertically extensible cover as claimed in claim 5 wherein the aperture defined by the outermost ends of said bifurcated base leg and said extending leg is blind.

7. A vertically extensible cover as claimed in claim 5 wherein the aperture defined by the outermost end of said bifurcated base leg and said extending legs is open on the side of one of the outermost ends of said bifurcated base leg and slopes angularly and downwardly toward the lower end of said folding arm.

* * * * *